United States Patent [19]

Lange

[11] 3,950,481

[45] Apr. 13, 1976

[54] PROCESS FOR INVERTING AN ENDLESS BELT-TYPE RECORDING BELT

[76] Inventor: George L. Lange, 2605 Boston, Muskogee, Okla. 74401

[22] Filed: Apr. 25, 1975

[21] Appl. No.: 571,495

Related U.S. Application Data

[63] Continuation-in-part of Ser. No. 436,122, Jan. 24, 1974, abandoned.

[52] U.S. Cl. ............... 264/294; 264/106; 264/295; 264/339
[51] Int. Cl.² ........................................ B29D 17/00
[58] Field of Search ............ 264/106, 294, 295, 339

[56] References Cited
UNITED STATES PATENTS

| | | | |
|---|---|---|---|
| 3,418,409 | 12/1968 | Hesse | 264/296 X |
| 3,557,275 | 1/1971 | Longshaw | 264/339 X |
| 3,705,224 | 12/1972 | Neff | 264/294 X |

*Primary Examiner*—Richard R. Kucia
*Attorney, Agent, or Firm*—Head, Johnson & Chafin

[57] ABSTRACT

A process for reversing the sides of a wide endless type recording belt comprising the steps of passing one edge of the belt through the interior of the belt, bending the said belt at a particular point on the belt and rotating the entire belt around the bent point until the belt is completely inverted. Two similar processes are disclosed, one leaving a slight protrusion formed by the bending of said belt and the other leaving a slight indentation in the belt after inverting the same.

5 Claims, 17 Drawing Figures

PROCESS FOR INVERTING AN ENDLESS BELT-TYPE RECORDING BELT

CROSS REFERENCE

This is a continuation-in-part application of copending application Ser. No. 436,122, filed Jan. 24, 1974 and now abandoned, for a "PROCESS FOR INVERTING AN ENDLESS BELT-TYPE RECORDING BELT."

BACKGROUND OF THE INVENTION

1. Field of the Invention

The present invention relates to a process for inverting wide endless belts and more particularly, but not by way of limitation to a process for inverting wide endless-belt type recording belts for use of the inside surface thereof for recording purposes.

2. Description of the Prior Art

In recent years there has been a widespread use of office dictating and recording machines which utilize flexible recording belts for storing data thereon. These belts are normally constructed of a plastic film material and are slipped over a pair of spaced drive rollers whereby the recording is made by use of a stylus which cuts a helical groove in the outer surface of the belt.

These belts are of necessity made from a material which is soft enough to be cut by the recording stylus but rigid enough to maintain a cylindrical shape when properly handled. Since the material is soft enough to be cut by the recording stylus the belts are susceptible to damage by scratches, bending and the like. In other words, when an attempt is made to bend the belt about a very small radius, a crease or indentation is made which permanently deforms the belt at that point. Since the plastic film material is consistent throughout the belt, the inside surface is also capable of being used for recording if the belt could be inverted or turned inside out.

However, the manufacturers have constructed these belts to have dimensions which heretofore has prevented the user from inverting the belt without completely destroying same.

SUMMARY OF THE INVENTION

The present process has been particularly developed for providing a simple and efficient method for reversing or inverting a wide endless-belt type recording belt. Two separate processes are disclosed herein, one being substantially the reverse of the other for inverting the belt and thereby providing complete use of the inverted side thereof with minimal damage to the belt itself. After the inverting operation, the belt is left with a single point indentation or protrusion, according to the process used, which may only very slightly interfere with the operation of the recorder when the stylus is at that particular position on the belt.

The first process simply requires that one edge of the belt be passed through the space encircled by the belt so that the surface of the belt adjacent to the pulled-through edge is substantially perpendicular to the opposite surface of the belt. The belt is then bent or folded at the midpoint of the surface adjacent to the edge that was pulled through and then the entire belt is rotated about the bend point which in effect causes the rest of the belt to pass through the interior of said belt which reverses the belt and leaves a small protrusion point in the belt where the bend or fold is made. The recorder stylus, when encountering this protrusion will usually track over the protrusion without any substantial interference with the recording.

The second process comprises the steps of pulling one edge of the belt through the space encircled by the belt and then making a bend or fold at a midpoint on the belt approximately one-fourth of the way around the belt from the edge that was pulled through. The belt is then rotated in the opposite direction from that of the first process which again feeds the belt through the space encircled by the belt thereby inverting same. This process leaves a small indentation point at the point of bending which when encountered by the stylus sometimes causes said stylus to slightly skip but seldom causes substantial interference with the recorded information.

The belts heretofore described present a substantial cost to the user and are usually constructed from petroleum products which may become quite scarce due to the energy shortage. This process will allow double usage of existing belts and is subject to being adapted to machines for accomplishing the inverting process.

DESCRIPTION OF THE DRAWINGS

Other and further advantageous features of the present invention will hereinafter more fully appear in connection with a detailed description of the drawings in which.

DESCRIPTION OF THE PROCESS

Figure 1:
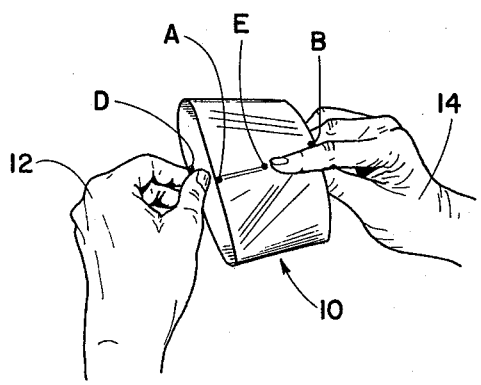
FIGS. 1 through 6 are perspective views depicting the steps of manually inverting a recording belt in accordance with one process embodying the invention.

Referring to the drawings in detail, reference character 10 generally indicates a wide endless-belt type recording belt being manipulated by left and right hands 12 and 14, respectively.

The belt 10 is generally described as a flexible cylindrical sleeve made from a plastic film material which resists stretching and is flexible to within a certain minimal radius without permanently deforming said material. When the material is bent or folded below this very small radius, permanent deformation occurs which damages the belt at the location of the deformation and often prevents further use with a recording machine (not shown) and its associated recording stylus (also not shown).

The permanent deformation caused by bending within a very small radius is due to the property of the film material to resist stretching. If stretching does occur, the belt becomes permanently deformed and is rendered substantially useless in the area affected by the stretching.

The most readily available recording belt of this nature is the belt produced by Dictaphone Company under the registered trademark "DICTABELT" or "DICTABELT VISIBLE RECORD." Any sharp fold or deformation can cause the stylus to jump or skip resulting in inadequate recordings. The Dictaphone belt or cylindrical sleeve 10 was dimensioned to prevent the sleeve from being inverted by the user. The standard dimensions for the sleeve are 3½ inches from end to end and 12 inches in circumference or belt length. It is readily seen that if the belt is at least 4 times as long as it is wide, it may be reversed by conventional methods without any damage to the belt. On the other hand, if the belt is less than approximately 3 times as long as it is wide, it cannot be reversed by even the present method without substantial damage to the belt. Extensive empirical tests were conducted which indicate that the minimum length-to-width ratio for inverting the belt by the approached present method $\tau$ 3.14 to 1 or $\pi$ to 1.

It was discovered that the said sleeves could be inverted by the process hereinafter set forth with minimal damages to the sleeve thereby permitting the reverse side of the sleeve to lso be used for recording which in effect provides twice the recording space for each sleeve.

For ease of description of the process, the drawings of the sleeve 10 have been labeled by imaginary points A through E. The point A is disposed at one edge or end of the sleeve 10, the point B lying on the opposite end of the sleeve in longitudinal alignment with the point A, and the point E lying on the line A–B approximately midway between the points A and B. A point C is disposed on the same end of the sleeve as point B diametrically opposite said point B and a point D is located diametrically opposite point A, forming an imaginary line C–D.

The first process will be described by manual manipulation of the sleeve in accordance with FIGS. 1 through 6.

Referring to FIG. 1 the sleeve 10 is held in place by grasping the sleeve at the point D with the left hand and at the point B with the right hand allowing the index finger of the right had to xtend toward the point A.

Figure 2:
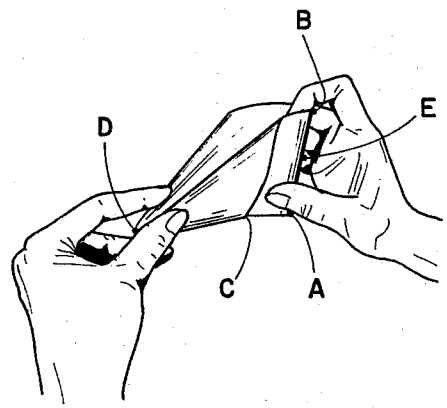

FIG. 2 depicts the first step of pulling point B up and away from point D thereby moving the point A through the interior of the sleeve toward and past the point C while still holding the point D in place, thereby forming a plate defined by the imaginary lines A–B and C–D.

Figure 3:
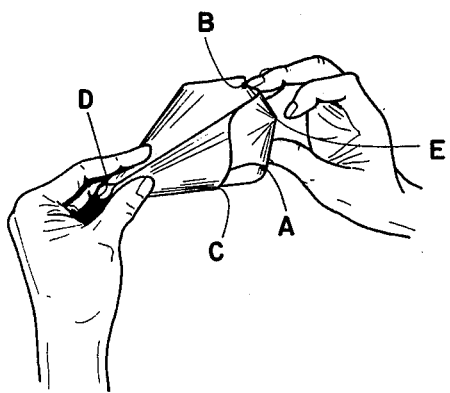

FIG. 3 depicts the second step of folding or bending the sleeve along the imaginary line A–B at the point E in a direction out of the said plane by using the index finger of the right hand while still grasping the sleeve with the left hand in the vicinity of point D.

Figure 4:
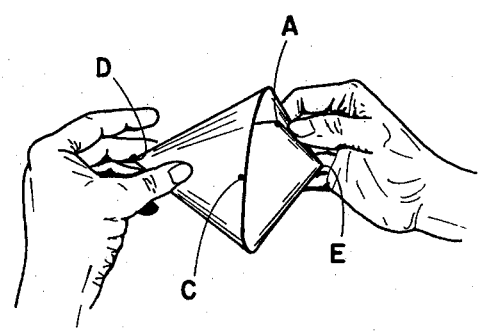

FIG. 4 depicts the beginning of the third step of rotating the sleeve about the point E by moving the thumbs of both hands in a direction over the index fingers. This movement can be aided by pressing the point B inwardly with the right hand middle finger while rotating the said sleeve.

Figure 5:
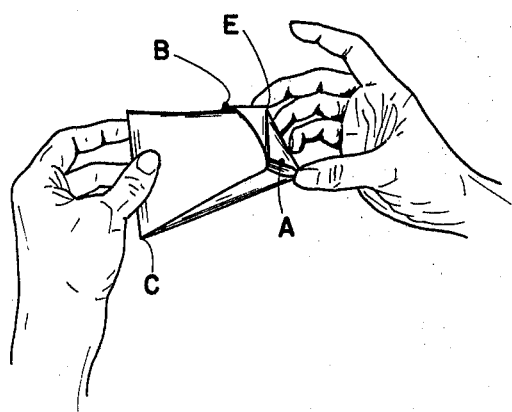

FIG. 5 shows the continuation of the third step of rotating the sleeve about the point E by grasping the sleeve with the left hand thumb and middle finger in the general area between the points C and D taking care not to create a fold at that point in the sleeve. The right hand may then be used for stability of the sleeve but is no longer required for the completion of the process. Continued rotation of the sleeve is accomplished by pulling the left thumb back toward the hand and frictionally pulling that portion of the sleeve in contact with the thumb and at the same time moving the left middle finger away from the hand and frictionally pushing that portion of the sleeve in contact with said middle finger with it.

Figure 6:
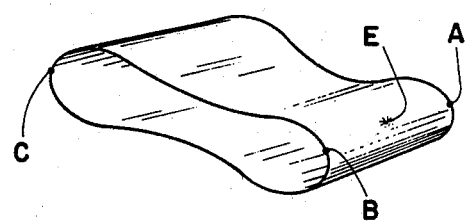

Continued rotation in this manner will feed that portion of the sleeve about the imaginary line C–D through the interior of the sleeve until the sleeve is completely inverted as depicted in FIG. 6. This process will leave a slight protrusion at the point E on the inverted recording surface. However, the stylus of the recorder usually tends to track over the protrusion without any interference in the recording.

It is readily apparent that the left and right hand rolls described in the above process may be reversed to accomplish the same process.

The second process depicted in FIGS. 7 through 14 is another method of inverting the sleeve 10. Again, for ease of description, the sleeve 10 is depicted as having imaginary points A through E in the same relative locations as described in the first process. An additional imaginary point F is disposed on the surface of the sleeve midway between the ends of the sleeve and midway between the imaginary lines A–B, C–D. A still additional imaginary point G is disposed on the surface of the sleeve midway between the ends and diametrically opposite point F.

Figure 7:
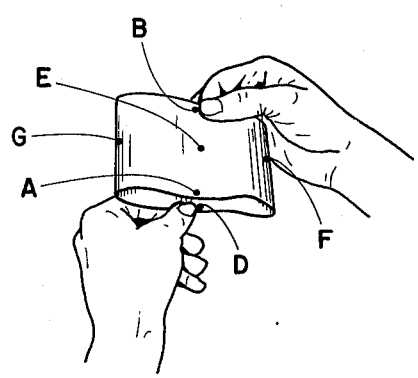
FIGS. 7 through 13 are perspective views depicting the steps of manually inverting a recording belt according to a second process embodying the invention.

This second process is initiated by grasping the sleeve at point D with the left hand and at point B with the right hand and is depicted in FIG. 7.

Figure 8:
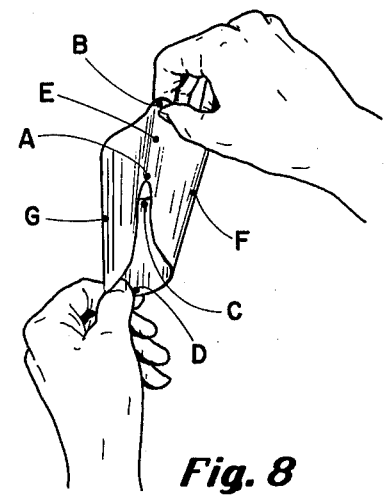

The first step of this process is depicted in FIG. 8 and is accomplished by pulling the point B up and away from point D thereby moving point A through the interior of the sleeve toward and past the point C which is similar to the first step of the first process thereby creating a plane defined by the imaginary lines A–B and C–D.

Figure 9:
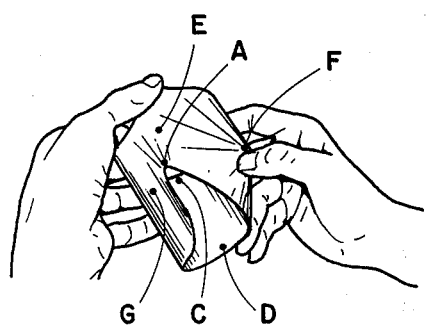
Figure 9A:
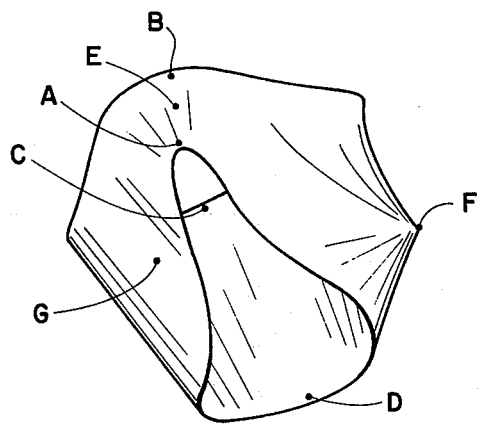
FIGS. 9A, 10A, 11A and 12A are perspective views depicting the position of the belt while performing the steps shown in FIGS. 9 through 12, respectively.

The sleeve is held in this position by grasping the sleeve with the left hand thumb at point B and the left middle finger at point A. The second step as depicted in FIG. 9 is accomplished by bending the sleeve at point F by placing the right thumb at point F and pressing outwardly away from the said plane.

Figure 10:
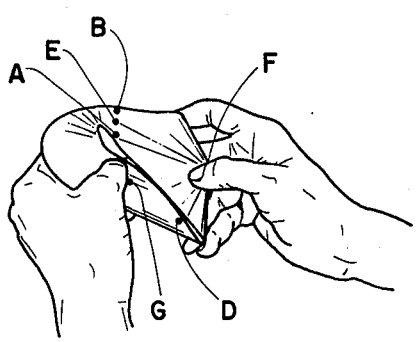
Figure 10A:
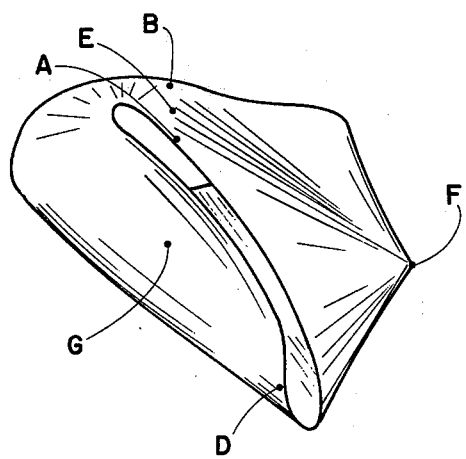
Figure 11:
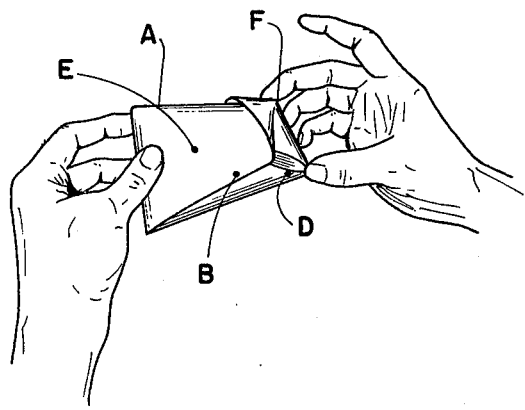
Figure 11A:
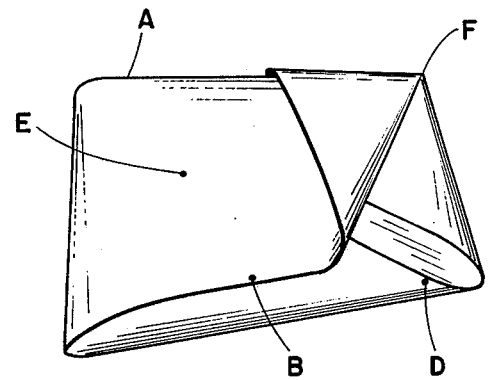
Figure 12:
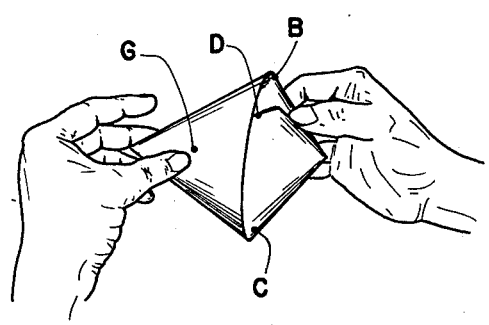
Figure 12A:
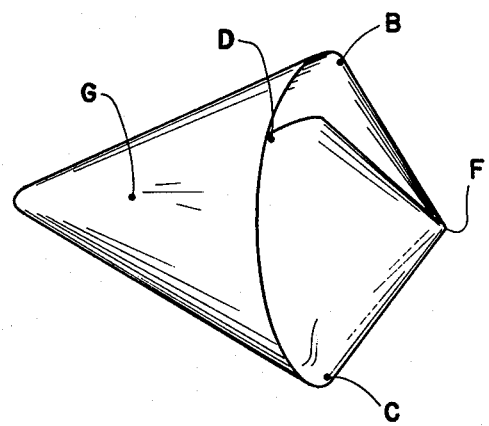

The third step of rotating the sleeve about point F is initiated as depicted in FIG. 10 by grasping said sleeve near the point G and frictionally moving the left thumb forward along with the portion of the sleeve in contact with said left thumb while simultaneously frictionally retracting the left middle finger pulling that portion of the sleeve in contact with said middle finger thereby moving the sleeve to the position shown in FIG. 11 or until the partially rotated belt takes on a substantially rectangular shape.

Figure 13:
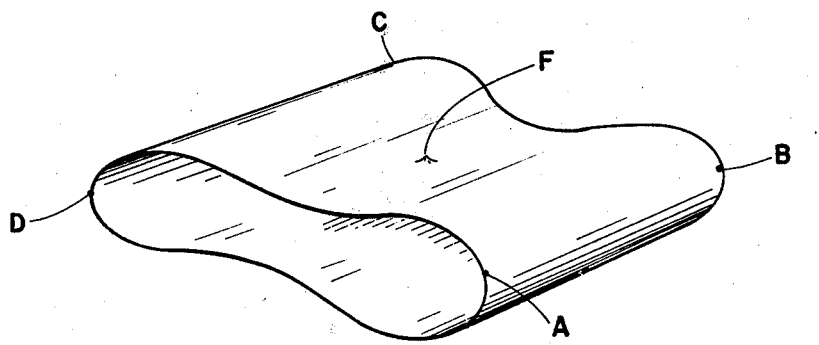

The rotation operation is continued by grasping the sleeve with the left hand thumb near the line A–B and the middle finger near the point G as depicted in FIG. 11. Again, the right hand may be used for stability but is no longer necessary for completion of the process. Continued rotation is accomplished by pushing the sleeve with the left thumb and pulling with the left middle finger through the position shown in FIG. 12 until the said sleeve reverses as shown in FIG. 13. This continued process in effect moves that portion of the belt around the imaginary line C–D through the interior of the belt until the sleeve is completely inverted.

Completion of this second process leaves the inverted recording surface with a slight indentation at point F which when encountered by the recording stylus (not shown) may cause said stylus to skip at that point but seldom substantially interferes with the recording.

From the foregoing it is apparent that the present invention provides a process for inverting a wide endless-belt type recording belt for use of the inverted side thereof for recording purposes, while causing minimal damage to the said recording belt.

Whereas, the present invention has been described in particular relation to the drawings attached hereto, it is obvious that other and further modifications of this process may be made within the spirit and scope of this invention.

What is claimed:

1. A process for inverting a wide endless belt-type recording belt, said belt being defined as a flexible cylindrical film sleeve having circumferential length at least not less than $\pi$ (3.14 . . .) times that of the width, not more than four times that of the width and including the steps of passing one edge of the belt through the interior of the belt without stretching said belt; bending the said belt at a single point and rotating the entire belt through the interior of said belt until the belt is completely inverted.

2. A process for inverting a wide endless belt-type recording belt, said belt being defined as a flexible cylindrical film sleeve having circumferential length at least $\pi$ (3.14 . . .) times that of the width and not more than four times that of the width and having a first longitudinal imaginary line across one surface thereof, said first longitudinal imaginary line having an imaginary point A at one end thereof, point B at the opposite end thereof and point E midway between points A and B, and a second longitudinal imaginary line across the film sleeve diametrically opposite the first imaginary line and having an imaginary point C at one end directly opposite the point B and an imaginary point D at the opposite end directly opposite the point A, said process comprising the steps of; (1) moving the point A through the interior of the sleeve toward and past the point C without stretching said belt thereby forming a plane defined by the first and second imaginary lines; (2) bending the sleeve along the first imaginary line at the point E and out of said plane; and (3) rotating the sleeve about the point E by moving the second imaginary line (C–D) through the interior of the sleeve until the sleeve is inverted.

3. A process for inverting a wide endless-belt type recording belt, said belt being defined as a flexible cylindrical film sleeve having circumferential length at least $\pi$ (3.14 . . .) times that of the width and not more than four times that of the width and having a first longitudinal imaginary line across one surface thereof, said line having imaginary end points A and B, a second longitudinal imaginary line across one surface of the sleeve diametrically opposite the first imaginary line and having an imaginary end point C directly opposite the point B and imaginary end point D directly across the point A, an imaginary point F located on the surface of the sleeve midway between the ends of the sleeve and midway around the sleeve between the first and second imaginary lines, said process comprising the steps of; (1) moving the point A through the interior of the sleeve toward and past the point C without stretching said belt thereby forming a plane defined by said first and second imaginary lines; (2) bending the sleeve at the point F, said point F being directed away from the said plane; and (3) rotating the sleeve about the point F by moving the second imaginary line (C–D) through the interior of the sleeve until said sleeve is inverted.

4. A process as set forth in claim 2 wherein the belt has a circumferential length of 12 inches and a width of 3⅓ inches.

5. A process as set forth in claim 3 wherein the belt has a circumferential length of 12 inches and a width of 3½ inches.

* * * * *